Patented Nov. 29, 1949

UNITED STATES PATENT OFFICE 2,489,348

PRODUCTION OF ARYLACETIC ACIDS AND AMIDES

Wilhelm Wenner, Montclair, N. J., assignor to Hoffmann-La Roche Inc., Roche Park, Nutley, N. J., a corporation of New Jersey No Drawing. Application January 15, 1947, Serial No. 722,282

5 Claims. (Cl. 260—515)

The present invention relates to a new method of producing arylacetic acids and the corresponding amides. More particularly, the invention relates to a new method of saponifying arylacetonitriles to form the corresponding arylacetic acids and the corresponding arylacetamides.

It is among the objects of the invention to provide a commercial process which is cheap, simple and easy to employ for large scale manufacture of arylacetic acids and amides.

Among the other objects of the invention is to provide a saponification process which:

(A) Permits execution of the reaction at temperatures below 100° C.

(B) Eliminates the use of organic solvents.

(C) Eliminates the need for recovery of solvents.

(D) Permits easy isolation of the products, preferably by mere filtration.

(E) Yields products of high purity.

(F) Eliminates the danger of violent reactions.

(G) Permits consecutive preparation of amides and acids.

(H) Permits preparation of amides in one step.

In accordance with the present invention, the above objects are accomplished by saponifying arylacetonitriles with aqueous concentrated hydrochloric acid by intimately mixing the reactants, as by prolonged agitation or stirring, or until solution occurs. By "concentrated hydrochloric acid" I mean hydrochloric acid in a concentration of at least 30%. In one of the preferred embodiments of the invention, α-tolunitrile (benzylcyanide, phenylacetic acid nitrile) is readily saponified by the new process to the important phenylacetamide and phenylacetic acid.

The saponification of α-tolunitrile is of technical importance because phenylacetic acid as such and its esters are widely used in the perfume industry (see Ullmann, Enzyklopaedie der Technischen Chemie, second edition, 1931, vol. 8, pp. 795 and 839). Although phenylacetic acid can be prepared starting with a number of compounds, the procedures used for a technical and economical synthesis use exclusively the cheap α-tolunitrile, which is easily accessible from benzylchloride.

Saponification of α-tolunitrile to the free acid has been effected in several ways. Alkaline saponification is not satisfactory (Adams and Thal, Organic Syntheses, Coll. vol. 1, second edition, 1941, page 437, chapter 3). Acid hydrolysis is superior and is therefore preferred for large scale manufacture. For this purpose strong sulfuric acid is usually utilized.

Concentrated sulfuric acid, however, is not suitable, because violent reactions occur. (See Note 1, Organic Syntheses, Coll. vol. 1, second edition, 1941, page 437.) To avoid the hazards of concentrated sulfuric acid, diluted sulfuric acid is generally used in technical operations. Since aqueous sulfuric acid does not dissolve α-tolunitrile, acetic acid is added as a solubilizer. Such mixtures must be boiled over a long period of time to accomplish saponification. The temperatures reached are higher than 100° C. which is detrimental to the purity of the compound. Furthermore, this procedure necessitates additional operations for the recovery of acetic acid.

Henle and Schupp (Berichte der Deutschen Chemischen Gesellschaft, 1905, vol. 38, page 1371) examined the action of hydrochloric acid on α-tolunitrile. They used gaseous hydrogen chloride dissolved in acetone and obtained as product of the reaction phenylacetamide. It is obvious that hydrogen chloride in acetone is not a convenient reagent, since it requires the use of gaseous hydrogen chloride for its preparation. The acetone is to a large extent converted into condensation products (mesityloxide) under the influence of hydrogen chloride. Besides, hydrogen chloride in acetone is an extremely unpleasant medium for technical purposes on account of its volatility.

Aqueous hydrochloric acid has not heretofore been used for the saponification of arylacetonitriles to arylacetic acids or arylacetamides. Mixtures of α-tolunitrile and aqueous hydrochloric acid separate at once, and the nitrile is recovered unchanged. If the mixture is stirred for a short period of time, I have found that apparently no reaction occurs. After stopping the agitator, the suspension separates in two layers; and on examination the top layer is found to be practically unchanged nitrile. This behavior would lead one to the conclusion that α-tolunitrile and aqueous hydrochloric acid do not react.

I have now surprisingly found that prolonged stirring of arylacetonitriles as, for example, α-tolunitrile, with aqueous concentrated hydrochloric acid or stirring until solution occurs leads to saponification with the formation of arylacetamides and arylacetic acids. If the mixtures of α-tolunitrile and concentrated aqueous hydrochloric acid are stirred over a long period of time, they become lighter in appearance, and finally complete solution is effected. The required period of time depends on several factors, the most important ones being temperature, rate of stirring, amount and concentration of hydrochloric acid. Rapid agitation, higher temperatures, and increased strength and larger amounts of hydrochloric acid speed up the homogenization. However, even under most favorable conditions, complete solution has never been observed to occur after a short time. At least 20 to 30 minutes of stirring is required under these conditions to obtain homogeneous solution. On the other hand, the reaction is not prevented by lower temperatures, less efficient stirring and smaller amounts of concentrated hydrochloric acid. Even at 0°, complete solution finally takes place, but it requires several hours to effect it. Accordingly, the expression "prolonged" is to be construed as covering a period of time of at least 20 to 30 minutes, or until solution or homogenization occurs.

The dissolution of α-tolunitrile is not a mere physical phenomenon. It is accompanied by a chemical transformation. It was found that the initial reaction consists of the addition of water to α-tolunitrile leading to the formation of phenylacetamide. When the reaction mixture is analyzed shortly after it becomes homogeneous, it consists to a large extent of phenylacetamide. Prolonged standing or stirring of the solution effects saponification of the phenylacetamide acid with simultaneous formation of ammonium chloride. Hence, the total reaction comprises two steps, A and B, as illustrated by the following equations employing α-tolunitrile as the starting material.

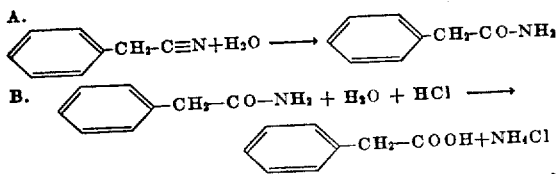

At low temperatures, the speed of reaction A is distinctly different from the speed of reaction B. Reaction A proceeds without difficulty at temperatures as low as 0° C. At this temperature, reaction B is very slow but not entirely suppressed. Hence, if the reaction is carried out at temperatures of 0°–10° C. until homogenization and then immediately worked up, the main reaction product obtained is phenylacetamide.

Reaction B becomes more rapid at higher temperatures. Therefore, if the reaction is carried out at temperatures of about 60° C. and higher, the initially formed phenylacetamide is split with increasing speed into the free acid and ammonium chloride.

The isolation of both compounds, phenylacetamide and phenylacetic acid, is facilitated by their solubility properties. One part of phenylacetamide is completely soluble in about five parts of concentrated hydrochloric acid at room temperature. In 25% hydrochloric acid it is still soluble in the ratio 1:7. In dilute hydrochloric acid, of about 10 per cent strength, it is only slightly soluble. To isolate phenylacetamide, it is therefore only necessary to dilute the reaction mixture after homogenization with water to a strength of 10 per cent or less of hydrochloric acid.

Phenylacetic acid is much less soluble in concentrated hydrochloric acid at room temperature and is also slightly soluble in hot concentrated hydrochloric acid. The longer the reaction mixture is stirred, the more free phenylacetic acid is formed, and on account of its low solubility it slowly crystallizes from the mixture. At temperatures above 60° C. the acid separates as an oil.

Accordingly, my invention includes the following technically convenient procedures for producing phenylacetamide and phenylacetic acid:

Phenylacetamide is made by stirring mixtures of α-tolunitrile and aqueous concentrated hydrochloric at temperatures of about 0° C. to about 40° C. until complete solution, and then the solution is immediately diluted with water. Phenylacetamide crystallizes and is isolated by filtration.

Phenylacetic acid can be made in several ways: The mixture of α-tolunitrile and concentrated hydrochloric acid is stirred at low temperatures as described for the preparation of the phenylacetamide, but then stirring is continued for a long period of time after homogenization. The saponification of the amide is more rapid if after homogenization the solution is warmed to temperatures above 50° C. The procedure can also be carried out at temperatures above 50° C. from the beginning.

As indicated above, the speeds of reactions A and B in concentrated hydrochloric acid differ distinctly with the temperature. In another respect also, the reactions show a different behavior. Reaction A requires strong hydrochloric acid. If the hydrochloric acid is weaker than about 30%, no complete solution is effected and the formation of the amide is very slow. On the other hand, reaction B is not restricted to the use of strong hydrochloric acid. Even rather dilute hydrochloric acid will saponify phenylacetamide. This behavior is very useful for practical purposes. It enables the use of more dilute acid for the second stage of the reaction, which proceeds faster at higher temperatures. Side reactions which are a frequent inconvenience caused by strong hydrochloric acid at higher temperatures are made less pronounced or are entirely absent when dilute hydrochloric acid is used. It is therefore advantageous to carry out reaction B at higher temperatures only after some dilution with water of the homogeneous solution. Practically colorless reaction products are obtained following this procedure. In the case of phenylacetic acid, the side reactions caused by concentrated hydrochloric acid at temperatures above 60° C. are not very significant, so that a satisfactory preparation of this particular acid by treatment of α-tolunitrile with concentrated hydrochloric acid even at higher temperatures is in every way feasible. In the case of certain substituted α-tolunitriles, however, the detrimental effect of concentrated hydrochloric acid becomes more apparent. With such nitriles, the dilution of the reaction mixture after the formation of the corresponding amide is the preferred procedure.

Substituted α-tolunitriles, when subjected to a similar treatment with concentrated hydrochloric acid, undergo the same type of reactions, leading to the corresponding amides and free acids. Depending on the nature of the particular substituents in α-tolunitriles, the appearance of the mixture during the reaction varies. The required temperatures differ also for different compounds. The following nitriles can readily be saponified by the new process to the corresponding amides and acids.

4-methyl-α-tolunitrile
4-isopropyl-α-tolunitrile
5,6,7,8-tetrahydronaphthyl-(2)-acetonitrile
4-methoxy-α-tolunitrile
2,3-dimethoxy-α-tolunitrile
3,4-dimethoxy-α-tolunitrile (veratrylcyanide)
Naphthyl-(1)-acetonitrile
4-phenoxy-benzylcyanide
4-phenylmercapto-benzylcyanide
2-cyanomethyl-phenoxathiin
2-cyanomethyl-dibenzofuran.

Alkyl-substituted α-tolunitriles react slower with increasing length of the alkyl-substituent. The initial temperature has to be higher than with α-tolunitrile itself. In the case of larger substituents (propyl and higher), the nitrile does not go into solution. However, the reaction is not prevented on this account. If, for example, 4-isopropyl-α-tolunitrile is stirred with concentrated hydrochloric acid, no change in the outside appearance of the reaction mixture becomes visible. On stopping the agitator, the mixture separates always in two layers, no matter how long the reaction is carried out. However, after several hours of intimate mixing of the reactants, it is found that the oil is no longer the nitrile but consists of the amide or the acid, depending on the duration of the stirring and the temperature. The same applies to the saponification of naphthyl-(1)-acetonitrile and of 5,6,7,8-tetrahydronaphthyl-(2)-acetonitrile.

In the case of alkoxy-substituted α-tolunitriles, the reaction occurs in general just as easily as with unsubstituted α-tolunitriles. For compounds of this type it is essential to avoid high hydrochloric acid concentrations at elevated temperatures in order to obtain good results in reaction B. The alkoxy groups are sensitive to concentrated hydrochloric acid particularly at high temperatures. Depending on the number of alkoxy groups and on their position in the phenyl ring, they are more or less easily split with formation of free phenolic hydroxyl groups by hot concentrated hydrochloric acid. This side reaction is avoided when the saponification of the corresponding amide is carried out in more dilute hydrochloric acid. It is therefore advantageous to dilute the reaction mixture with water after formation of the amide before heating it to secure further saponification to the free acid.

It is clear from the description above that the new procedure is in every respect superior to the known ones. It allows the preparation of the amides or acids from aryl-acetonitriles like α-tolunitrile and its substituted derivatives in an exceedingly simple manner.

The main advantages of the new process are:
1. Execution of the reaction at temperatures below 100°.
2. No organic solvents are required for the reaction.
3. No recovery of solvents is necessary.
4. The products are isolated in general by mere filtrations.
5. The products are of high purity.
6. The procedure is without danger of violent reactions.
7. The simultaneous preparation of amides and acids is possible by simply changing the temperature and the concentration of the hydrochloric acid after the initial formation of the amide.
8. The procedure allows the preparation of the amides in one single step, whereas the known procedures require several steps, the best methods using esters or acid chlorides as intermediates which in turn have first to be made from the nitriles, therefore necessitating several intermediates.

The following examples will serve to illustrate the invention:

EXAMPLE 1

*Phenylacetic acid*

100 grams of α-tolunitrile and 300 cc. of concentrated hydrochloric acid are stirred at room temperature, surrounded by a water bath of 15–20° C. After two and one-half hours stirring, a homogeneous solution is formed. After stirring for two hours more, 100 cc. of water are added. A precipitate appears. Stirring is continued and the temperature is raised to 40° C. The precipitate redissolves within a few minutes. After about one hour, the mixture becomes turbid and slowly a precipitate forms which augments until after three more hours a thick paste is obtained. The mixture is filtered yielding colorless phenylacetic acid, M. P. 70–72° C. Extraction of the mother liquor yields additional 5 grams phenylacetic acid.

EXAMPLE 2

*Phenylacetic acid*

200 grams of α-tolunitrile and 800 cc. of concentrated hydrochloric acid are stirred for one hour at 50° C. then at 70° C. for five hours. After initial dissolution an oil separates. After six hours the mixture is cooled and diluted with 1500 cc. of water. The mixture is extracted repeatedly with ether. The combined ether extracts are distilled to dryness, phenylacetic acid being obtained.

EXAMPLE 3

*Phenylacetamide*

50 grams of α-tolunitrile are stirred at room temperature with 200 cc. of concentrated hydrochloric without external cooling or heating. The temperature rises slowly to about 45° C.; at the same time a homogeneous solution is formed. Gradually the temperature drops. After two hours, 200 cc. of water are added, the reaction flask being cooled with tapwater. Phenylacetamide crystallizes. It is filtered, washed with water, and dried.

EXAMPLE 4

*Phenylacetamide*

50 grams of α-tolunitrile are stirred with 200 cc. of concentrated hydrochloric acid, the flask being cooled to 15–20° C. by a water bath. After one and one-half hours, a homogeneous solution is formed. Stirring is continued for five hours at 20° C. The mixture is then cooled with ice water, 200 cc. of water are slowly added. Phenylacetamide precipitates and is filtered by suction.

EXAMPLE 5

*Phenylacetamide*

300 grams of α-tolunitrile is stirred with 1200 cc. of concentrated hydrochloric acid, the temperature being kept at 10° C. by a water bath. After 20 hours the mixture is cooled with ice water and 1200 cc. of water are added slowly. The precipitated phenylacetamide is filtered and washed with water.

EXAMPLE 6

*4-methyl-phenylacetic acid*

50 grams of 4-methyl-α-tolunitrile and 200 cc. of concentrated hydrochloric acid are stirred for 15 hours at 70–90° C. After cooling, 200 cc. of water is added whereupon the oil solidifies. The colorless precipitate is filtered and washed with water. The crude acid is purified by dissolving in sodium carbonate filtering the solution and addition of dilute hydrochloric acid. 4-methyl-α-toluic acid, M. P. 83–85° C. is obtained.

EXAMPLE 7

*4-methyl-phenylacetamide*

50 grams of 4-methyl-α-tolunitrile and 200 cc. of concentrated hydrochloric acid are stirred for four hours at 50° C. The mixture is cooled and diluted with 200 cc. of water. A solid forms which is filtered and washed with ether. It is practically pure 4-methyl-phenylacetamide. Crystallization from benzene yields the pure compound of M. P. 180–182° C.

EXAMPLE 8

4-isopropyl-phenylacetic acid 20 grams of 4-isopropyl-α-tolunitrile and 200 cc. of hydrochloric acid 35 per cent are stirred for ten hours at 90–100° C. The mixture, which does not become homogeneous, is then diluted with 200 cc. of water and cooled to room temperature and extracted with ether. From the ether solution, 4-isopropyl-phenylacetic acid is extracted with sodium carbonate solution. The acid is liberated by addition of hydrochloric acid and taken up in ether. The ether solution is washed with water, dried and distilled to dryness. Crude 4-isopropyl-phenylacetic acid is obtained. Vacuum distillation gives the pure acid of B. P. 170–174° C., which after solidification has an M. P. of 38–40° C.

EXAMPLE 9

4-isopropyl-phenylacetamide 20 grams of 4-isopropyl-α-tolunitrile and 100 cc. of concentrated hydrochloric acid are stirred for eight hours at 80° C. The mixture does not become homogeneous. It is cooled and diluted with 100 cc. of water. 4-isopropylphenylacetamide M. P. 169–171° C. is obtained by filtration.

EXAMPLE 10

Naphthyl-(1)-acetic acid 20 grams of naphthyl-(1)-acetonitrile are stirred with 100 cc. of concentrated hydrochloric acid for five hours at 60–70° C. 50 cc. of water are then added. The mixture is refluxed with stirring for ten hours. After cooling, the mixture is extracted with sodium carbonate. The alkaline extract is acidified and extracted with benzene. The benzene layer is distilled to dryness leaving naphthyl-(1)-acetic acid. The acid is purified by recrystallization from benzene-petrolether or water.

EXAMPLE 11

Naphthyl-(1)-acetamide 20 grams of naphthyl-(1)-acetonitrile is stirred with 100 cc. of concentrated hydrochloric acid for six hours at 30–40° C. Naphthyl-(1)-acetamide separates in crystalline form. It is filtered, washed with water and ether. The crude amide is purified by crystallization from benzene or alcohol, M. P. 175° C.

EXAMPLE 12

5,6,7,8-tetrahydronaphthyl-(2)-acetic acid 6 grams of 5,6,7,8-tetrahydronaphthyl-(2)-acetonitrile is stirred with 60 cc. of concentrated hydrochloric acid at 70° C. for eight hours. After cooling, the mixture is extracted with ether. The ether extract is repeatedly extracted with sodium carbonate solution. The combined sodium carbonate extracts are acidified and extracted with ether. The ether solution is evaporated, yielding crude 5,6,7,8-tetrahydronaphthyl-(2)-acetic acid. The pure acid is obtained by crystallization from benzene-petrol ether and melts at 95–97° C.

EXAMPLE 13

5,6,7,8-tetrahydronaphthyl-(2)-acetamide 15 grams of 5,6,7,8-tetrahydronaphthyl-(2)-acetonitrile is stirred with 75 cc. of concentrated hydrochloric acid at 25° C. After one hour, the mixture is homogeneous. Stirring is continued at 50° C. for four more hours. An oil separates which on addition of 150 cc. of water solidifies. It is filtered and washed with water. The crude tetrahydronaphthyl-(2)-acetamide on recrystallization from benzene yields the pure compound, M. P. 142° C.

EXAMPLE 14

4-methoxy-phenylacetic acid amide 20 grams of 4-methoxy-α-tolunitrile and 100 cc. of concentrated hydrochloric acid are stirred and heated to 50° C. for three hours. 200 cc. of water are added. The amide crystallizes and is filtered. The solid is treated with sodium carbonate solution and again filtered, the amide being obtained.

EXAMPLE 15

4-methoxy-phenylacetic acid 50 grams of 4-methoxy-α-tolunitrile and 250 cc. of concentrated hydrochloric acid are stirred at room temperature for 15 hours. 250 cc. of water are added slowly. The mixture is then heated with stirring to 70° C. for fifteen hours. After cooling, the solution is extracted with ether. The ether layer is evaporated. The residue is distilled in the vacuum. 4-methoxy-phenyl-acetic acid, B. P. 184–186° C. is obtained.

EXAMPLE 16

Homoveratric acid amide 500 grams of 3,4-dimethoxy-α-tolunitrile (veratryl-cyanide) are stirred at 15° C. with 1000 cc. of concentrated hydrochloric acid. The nitrile dissolves slowly, the temperature rising to about 35° C. After about two to three hours, homoveratric acid amide starts to crystallize. In the course of about three more hours, the mixture has become very thick. About 2000 cc. of water are added and the mixture is filtered. There is obtained homoveratric acid amide.

EXAMPLE 17

Homoveratric acid 100 grams of 3,4-dimethoxy-α-tolunitrile are stirred with 200 cc. of concentrated hydrochloric, the temperature being kept below 40° C. by external cooling. When all the nitrile is dissolved (after about three hours), the temperature is raised to 50° C. for two more hours. The mixture is then diluted with 700 cc. of water and refluxed with stirring. After a short time the liquid becomes turbid, and soon an oil starts to separate. After boiling for seven hours, the mixture is cooled. When the temperature reaches 40–45° C. the oil solidifies. It is essential to stir vigorously at this point in order to avoid the formation of a solid cake. The mixture is cooled for several hours to 0° C. The sandy homoveratric acid is filtered and washed with about 40 cc. of ice cold water. The crude acid is purified by dissolving in sodium carbonate, filtering and acidifying with hydrochloric acid. The pure acid melts at 96–97° C.

EXAMPLE 18 o-Homoveratric acid amide (2,3-dimethoxy-phenylacetamide)

20 grams of 2,3-dimethoxy-α-tolunitrile are stirred with 100 cc. of concentrated hydrochloric acid for four hours at room temperature. The solution is diluted with 300 cc. of water. The amide remains in solution. It is extracted with chloroform. The chloroform extract is distilled to dryness, yielding crude o-homoveratric acid amide. Recrystallization from benzene gives the pure amide of M. P. 109–111° C.

EXAMPLE 19

*o-Homoveratric acid (2,3-dimethoxyphenyl-acetic acid)*

20 grams of 2,3-dimethoxy-α-tolunitrile and 100 cc. of concentrated hydrochloric acid are stirred at room temperature for three hours. 300 cc. of water are added and the mixture heated to 80° C. for ten hours with stirring. An oil separates and is extracted with ether. The ether layer is extracted with sodium carbonate solution. The sodium carbonate extract is acidified and the mixture is extracted with ether. The ether is distilled leaving crude o-homoveratric acid as an oil which crystallizes on standing. The acid is purified by distillation in vacuo. It boils at 235–240° C./20 mm.

The new process is equally applicable for the saponification of polynuclear acetonitriles, such as 4-phenoxybenzylcyanide, 4-phenyl-mercapto-benzylcyanide, 2-cyanomethyl-phenoxathiin, 2-cyanomethyl-dibenzofuran, and the like to form the corresponding amides and acids. Since these nitriles are of high molecular weight, they are practically insoluble in water. It has been found that in spite of the larger molecule, these nitriles are saponified without difficulty by the new procedure.

In general, the saponification of these nitriles is accomplished by stirring them in concentrated hydrochloric acid for about 14–18 hours at 80–90° C. The acids are isolated by ether extraction, and purified over the sodium salts. Acidification yields the free acids which are purified by recrystallization from suitable solvents.

The following examples will serve to illustrate the preparation of the new nitriles as well as their saponification.

EXAMPLE 20

*4-phenoxy-benzylcyanide*

218 grams of 4-phenoxy-benzylchloride are added to a solution of 160 grams of sodium cyanide in 200 cc. of water to which 1000 cc. of alcohol are added. The mixture is stirred and refluxed for about ten hours. 1000 cc. of water are added, and the nitrile is extracted with ether. The ether solution is washed repeatedly with water, dried over potassium carbonate and evaporated in a water bath. An oil remains, which on fractionation in vacuo, gives the nitrile of B. P. 155–160° C. at 0.15 mm.

From the fraction boiling at 160–200° C., a crystalline compound is isolated by crystallization from benzene. It melts at 160–162° C. It is 4-phenoxy-phenylacetamide.

EXAMPLE 21

*4-phenoxy-phenylacetic acid*

20 grams of 4-phenoxy-benzylcyanide are stirred with 200 cc. of concentrated hydrochloric acid at 80–90° C. for sixteen hours. The mixture is cooled, diluted with 300 cc. of water and extracted with ether. From the ether the acid is extracted with dilute sodium carbonate solution. Addition of dilute hydrochloric acid liberates the free acid which is taken up in ether. The ether is evaporated leaving the acid as an oil which crystallizes on standing.

Recrystallization from dilute acetic acid gives pure 4-phenoxy-phenylacetic acid of M. P. 55–56° C.

EXAMPLE 22

*4-phenylmercapto-benzylcyanide*

43 grams of chloromethyl-diphenylsulfide (4-phenylmercapto-benzylchloride), are dissolved in 200 cc. of acetone and the solution is added to a solution of 19 grams of sodium cyanide in 20 cc. of water. The mixture is stirred and refluxed for five hours. After cooling the solution is filtered. The filtrate is distilled on the water bath. The remaining oil is dissolved in benzene, the benzene solution is washed with water and distilled. The residue is fractionated in vacuo, yielding 4-phenyl-mercapto-benzylcyanide as a liquid of B. P. 190–200° C./10 mm.

EXAMPLE 23

*4-phenylmercapto-phenylacetic acid*

7 grams of 4-phenylmercapto-benzylcyanide are stirred with 100 cc. of concentrated hydrochloric acid at 80–90° C. for fourteen hours. Water is added and the mixture is extracted with ether. The ether layer is repeatedly extracted with dilute sodium carbonate solution. The alkaline extract is acidified with hydrochloric acid. 4-phenylmercapto-phenylacetic acid separates as an oil which soon crystallizes. It is filtered. Recrystallization from benzene-petrolether gives the pure acid of M. P. 74–76° C.

EXAMPLE 24

*2-cyanomethyl-phenoxathiin*

62 grams of 2-chloromethyl-phenoxathiin prepared by chloromethylation of phenoxathiin are added to a solution of 25 grams of sodium cyanide in 30 cc. of water and 400 cc. of alcohol. The mixture is refluxed for five hours with stirring. The alcohol is distilled off. The residue is treated with water and ether. The ether layer is distilled, leaving the crude nitrile. Distillation in vacuo gives a product of B. P. (10 mm.) 190–205° C. The nitrile solidifies on standing. Recrystallization from methanol yields the pure compound of M. P. 85–88° C.

EXAMPLE 25

*Phenoxathiin-2-acetamide and corresponding acid*

5 grams of 2-cyanomethyl-phenoxathiin are vigorously stirred with 100 cc. of concentrated hydrochloric acid at 80–90° C. for fifteen hours. The mixture is cooled, 200 cc. of water are added, and the crystals are filtered. They are treated with sodium carbonate solution. A small amount remains undissolved and is recrystallized from alcohol. The compound is phenoxathiin-2-acetamide with an M. P. of 200–202° C.

The sodium carbonate extract is acidified with dilute hydrochloric acid. Phenoxathiin-2-acetic acid separates crystalline. It is filtered and recrystallized from 60 per cent acetic acid, M. P. 193–194° C.

EXAMPLE 26

*2-cyanomethyl-dibenzofuran*

108 grams of 2-chloromethyl-dibenzofuran are added to a solution of 69 grams of sodium cyanide in 150 cc. of water and 600 cc. of alcohol.

The mixture is stirred and refluxed for eight hours. The solvents are distilled off and the residue is stirred with water and ether. The ether solution is separated, washed and evaporated on the water bath. The residue is dissolved in benzene.

The benzene solution is filtered through charcoal and evaporated to dryness. The oily residue is fractionated in vacuo. 2-cyanomethyl-dibenzofuran, B. P. 185–190° C. at 0.1 mm. is obtained. The nitrile solidifies on standing. Recrystallization from absolute alcohol yields the pure compound of M. P. 88–90° C.

EXAMPLE 27

*Dibenzofuran-2-acetic acid*

10 grams of 2-cyanomethyl-dibenzofuran are stirred with 150 cc. of concentrated hydrochloric acid for 15 hours at 80–90° C. 200 cc. of water are added, and the crystals are filtered. They are treated with sodium carbonate solution. Most of the material dissolves. The solution is filtered, acidified with dilute hydrochloric acid, and the precipitated crystals are filtered and washed with water. They are recrystallized from 70 per cent of acetic acid. The pure dibenzofuran-2-acetic acid melts at 213–214° C.

If the acid is crystallized from methanol, it contains half a molecule of methanol, and has M. P. of 147–149° C.

I claim:

1. A process for the hydrolysis of benzylcyanide which comprises mixing benzylcyanide with concentrated aqueous hydrochloric acid of at least 30 per cent strength and stirring the two materials together in the absence of any added organic solvent for the benzylcyanide at a temperature not in excess of 100° C. and at atmospheric pressure and for a period of at least 20 to 30 minutes to effect dissolution of the reactants.

2. A process according to claim 1 in which hydrolysis is effected at a temperature not exceeding about 40° C., and the reaction is discontinued after a clear solution has been effected whereby the end product is phenylacetamide.

3. A process according to claim 2 characterized by the precipitation of the phenylacetamide thus formed by the addition of water to the clear solution.

4. A process according to claim 1 in which the hydrolysis is continued for a time sufficient to produce phenylacetic acid as the end product.

5. A process according to claim 1 in which the reaction is carried out at a temperature not exceeding about 40° C. for the initial formation of a clear solution, followed by an increase in temperature but not in excess of 100° C. to convert the phenylacetamide formed at the lower temperature into phenylacetic acid.

WILHELM WENNER.

REFERENCES CITED

The following references are of record in the file of this patent:

UNITED STATES PATENTS

| Number | Name | Date |
| --- | --- | --- |
| 2,229,897 | Migrdichian | Jan. 28, 1941 |
| 2,361,576 | Tomlinson | Oct. 31, 1944 |

OTHER REFERENCES

Salkowski, Berichte, vol. 17, part I, page 506, 1884.

Kikkoji, Beilstein (Handbuch, 4th ed.), vol. 9, Suppl. p. 278 (1932).

Rabinovitch et al., Can. J. Research, vol. 20 B, pp. 73–81, 121–132 (1942).

Migrdichian, "The Chem. of Org. Cyanogen Compounds," ACS Monograph #105, Reinhold, pp. 37–46 (1947).

Chem. Abstracts, vol. 33, page 5387.